(12) United States Patent
Laitala et al.

(10) Patent No.: US 8,961,795 B2
(45) Date of Patent: Feb. 24, 2015

(54) APPARATUS AND METHOD FOR REMOVING IMPURITIES IN CONNECTION WITH LIQUID-LIQUID EXTRACTION OF COPPER

(75) Inventors: Hannu Laitala, Kauniainen (FI); Erkki Paatero, Kauniainen (FI); Bror Nyman, Vanha-Ulvila (FI); Eero Ekman, Pori (FI)

(73) Assignee: Outotec Oyj, Espoo (FI)

( * ) Notice: Subject to any disclaimer, the term of this patent is extended or adjusted under 35 U.S.C. 154(b) by 558 days.

(21) Appl. No.: 13/258,096

(22) PCT Filed: Mar. 25, 2010

(86) PCT No.: PCT/FI2010/050236
§ 371 (c)(1),
(2), (4) Date: Sep. 21, 2011

(87) PCT Pub. No.: WO2010/109078
PCT Pub. Date: Sep. 30, 2010

(65) Prior Publication Data
US 2012/0018376 A1 Jan. 26, 2012

(30) Foreign Application Priority Data
Mar. 27, 2009 (FI) ...................................... 20090119

(51) Int. Cl.
*B01D 11/04* (2006.01)
*B01D 17/02* (2006.01)
(Continued)

(52) U.S. Cl.
CPC ........ *C22B 15/0089* (2013.01); *B01D 11/0457* (2013.01); *C22B 3/0017* (2013.01); *C22B 3/02* (2013.01); *C22B 34/34* (2013.01)
USPC ........... 210/634; 210/194; 210/209; 210/511; 210/519; 210/639; 210/800; 210/805; 423/24; 423/27; 423/658.5; 422/258

(58) Field of Classification Search
CPC .... B01D 11/02; B01D 11/04; B01D 11/0446; B01D 11/0449; B01D 11/0473; B01D 11/0492; B01D 17/02; B01D 17/0208; B01D 21/003; B01D 21/0039; B01D 21/0042; B01D 21/0057; B01D 21/024; B01D 21/02405; B01D 11/045; C22B 3/0017; C22B 3/02; C22B 3/16; C22B 15/00; C22B 15/0063; C22B 15/0084; C22B 15/0086; C22B 15/0089; C22B 34/34
USPC .............. 210/194, 209, 511, 519, 521, 532.1, 210/538, 540, 634, 639, 799, 800, 801, 210/805; 423/24, 27, 658.5; 422/256–259
See application file for complete search history.

(56) References Cited

U.S. PATENT DOCUMENTS 1,920,499 A * 8/1933 Flumerfelt ...................... 554/12
2,701,753 A * 2/1955 Eisenlohr et al. ........... 423/658.5
(Continued)

FOREIGN PATENT DOCUMENTS

CA 1 064 574 9/1979
ES 2 156 504 A1 6/2001
(Continued)

OTHER PUBLICATIONS

International Search Report (PCT/ISA/210) issued on Jun. 1, 2010, by Finnish Patent Office as the International Searching Authority for International Application No. PCT/FI2010/050236.

*Primary Examiner* — Joseph Drodge
(74) *Attorney, Agent, or Firm* — Buchanan, Ingersoll & Rooney PC (57) ABSTRACT

The invention relates to an apparatus and method for removing molybdenum and other possible impurities from an organic copper-containing extraction solution in connection with the liquid-liquid extraction related to copper recovery. The removal of impurities occurs in one or several removal units built into the organic extraction solution storage tank.

23 Claims, 4 Drawing Sheets

(51) Int. Cl.
*B01D 21/24* (2006.01)
*C22B 3/02* (2006.01)
*C22B 15/00* (2006.01)
*C22B 34/34* (2006.01)
*C22B 3/30* (2006.01)

(56) References Cited

U.S. PATENT DOCUMENTS

| | | | |
|---|---|---|---|
| 2,714,056 A * | 7/1955 | Poffenberger | 423/658.5 |
| 3,415,616 A | 12/1968 | Agers et al. | |
| 3,479,378 A * | 11/1969 | Kirkpatrick et al. | 556/24 |
| 4,026,988 A | 5/1977 | Wells et al. | |
| 4,039,404 A | 8/1977 | Richards et al. | |
| 4,268,484 A * | 5/1981 | Gavin | 422/259 |
| 4,292,277 A * | 9/1981 | Bonney et al. | 422/259 |
| 4,786,187 A * | 11/1988 | Nyman et al. | 366/265 |
| 5,185,081 A * | 2/1993 | Nyman et al. | 210/634 |
| 6,099,732 A * | 8/2000 | Dorlac | 210/634 |
| 6,242,625 B1 * | 6/2001 | Kordosky | 556/110 |
| 6,706,186 B1 * | 3/2004 | Nyman et al. | 210/634 |
| 7,507,343 B2 * | 3/2009 | San Lorenzo et al. | 210/634 |
| 2006/0113246 A1 | 6/2006 | Ekman et al. | |
| 2006/0283797 A1 * | 12/2006 | Nyman et al. | 210/634 |
| 2007/0029254 A1 * | 2/2007 | Nyman et al. | 210/634 |
| 2007/0246418 A1 | 10/2007 | Lyyra et al. | |
| 2008/0245734 A1 | 10/2008 | Cheng et al. | |
| 2009/0074639 A1 | 3/2009 | Savage et al. | |
| 2010/0176061 A1 * | 7/2010 | Monzyk et al. | 210/702 |

FOREIGN PATENT DOCUMENTS

| | | |
|---|---|---|
| WO | WO 2004/108245 A1 | 12/2004 |
| WO | WO 2005/120677 A1 | 12/2005 |
| WO | WO 2006/032097 A1 | 3/2006 |
| WO | WO 2009/038962 A1 | 3/2009 |

* cited by examiner

APPARATUS AND METHOD FOR REMOVING IMPURITIES IN CONNECTION WITH LIQUID-LIQUID EXTRACTION OF COPPER

FIELD OF THE INVENTION

The invention relates to an apparatus and method for removing molybdenum and other possible impurities from organic copper-containing extraction solution in connection with the liquid-liquid extraction related to copper recovery. The removal of impurities occurs in one or several removal units built into the organic extraction solution storage tank.

BACKGROUND OF THE INVENTION

At times copper-bearing minerals also contain small amounts of molybdenum, which dissolves into aqueous solution in copper mineral leaching conditions. In the copper production process, after leaching the solution purification stage often used is liquid-liquid extraction by means of organic extraction solution, in which copper is transferred to the organic phase, leaving most of the impurities in the aqueous solution. The extraction reagents used nowadays in the organic extraction solution of the liquid-liquid extraction of copper are generally different types of hydroxy oximes, such as for example 5-dodecyl salicylaldoximes. The use of hydroxy oximes also for the extraction of molybdenum is mentioned for instance in U.S. Pat. No. 3,415,616. It is also known that molybdenum is extracted with copper into the organic phase in copper extraction conditions. In the pH range of the extraction stages in copper extraction, molybdenum appears mostly as molybdic acid $H_2MoO_4$ and molybdate cations $MoO_2^{2+}$. Kinetically, the extraction of molybdenum to the organic phase is rapid.

Earlier it has been observed that in connection with copper, molybdenum can also be extracted with a quinoline-based extraction reagent, as described for instance in Canadian patent publication 1061574. However, quinoline-based extraction reagents are not in general use nowadays in copper extraction processes.

It is also known in the prior art that molybdenum is not removed from organic solution in copper stripping conditions. As a result, molybdenum is gradually concentrated in the organic phase and consequently reduces the copper extraction capacity of the organic phase and lengthens the settling times of the phases in the settler. At high concentrations, molybdenum may also raise the viscosity of the extraction solution. Raised organic phase viscosity is one of the worst problems at the extraction plant, since in this case the organic extraction solution is firstly hard to pump and therefore demands more energy to form a dispersion. Secondly, raised viscosity generally means that the extraction reactions also slow down and thus the copper extraction capacity deteriorates.

U.S. Pat. No. 4,026,988 describes a method for the selective separation of molybdenum from an aqueous solution that also contains copper. According to the method, the extraction solution used is a molybdenum-selective α-hydroxy oxime, to which nonyl phenol is added to facilitate stripping. When the pH of the aqueous solution is kept in a range below 2, extraction of copper is fairly minimal, but molybdenum is extracted well. Copper extraction from an aqueous solution from which molybdenum has been removed, nevertheless requires in this case a second extraction process, so as a whole the method is not simple.

A method is described in Spanish patent publication 2156504 for separating copper and molybdenum from an aqueous solution by means of extraction. The extraction reagents used are commercial oximes in conditions in which both copper and molybdenum are extracted into an organic solution. Stripping takes place in two stages. In the first stage the organic solution is brought into contact with an aqueous sulphuric acid-containing solution, whereupon the majority of the copper is transferred to the aqueous solution, but in practice no molybdenum is transferred at all. After this, the second stage of stripping is performed, in which the organic solution is contacted with an ammonia-containing aqueous solution with a residence time of 10-60 minutes. When the ammonia concentration is 1 mol/l according to example 3, almost all the molybdenum is transferred to the aqueous solution. After stripping, the organic solution is scrubbed possibly with an acid-containing aqueous solution to remove the residual ammonia and is routed back into circulation.

In the methods described in both U.S. Pat. No. 4,026,988 and ES publication 2156504, the stripping of molybdenum requires its own equipment unit. In the situation where the quantity of molybdenum is small and the purpose is mainly to remove it from organic solution, separate stripping equipment constitutes a fairly substantial cost item. When an ammonia-based aqueous solution is used to strip molybdenum, an additional separate scrubbing stage is needed to remove the ammonia from the organic extraction solution.

WO application publication 2005/120677 describes an apparatus in which the organic extraction solution containing valuable metals is scrubbed of aqueous solution droplets in the organic extraction solution storage tank. The scrubbing solution, which is an aqueous solution, is mostly fed into the organic solution before this solution is routed into the tank. The scrubbing apparatus includes droplet coalescer equipment, and the remaining part of the aqueous solution is routed to the tank at the point of the droplet coalescer equipment. The organic solution is fed into the bottom part of the storage tank in several different substreams and removed from the surface section of the liquid layer at the rear end of the tank in several substreams. The scrubbing solution is removed from the bottom section of the rear end of the tank in several substreams.

PURPOSE OF THE INVENTION

The purpose of this invention is to remove the impurity substances contained in a copper-containing organic solution, such as molybdenum, by modifying the equipment normally included in liquid-liquid extraction and thus to obtain a simple apparatus and method, enabling the avoidance of the problems presented above. In accordance with the invention, the organic solution storage tank that normally belongs to the liquid-liquid extraction apparatus is provided with equipment by means of which molybdenum and other possible impurity substances that have been extracted from the aqueous solution to the organic extraction solution are separated from the extraction solution before the actual copper stripping stage. The copper-containing organic extraction solution is routed to the purification stage that occurs in the storage tank, in which the solution is scrubbed with an aqueous solution before the copper stripping stage. The properties of the aqueous solution are regulated according to the impurity substance to be removed. When scrubbing of the extraction solution takes place in the storage tank, investment costs are considerably smaller than in a separate stripping step. A purification stage that takes place in the storage tank also makes it possible to omit completely the scrubbing step comprising mixers and a settler that is usually included in liquid-liquid extraction.

SUMMARY OF THE INVENTION

The essential features of the invention will be made apparent in the attached claims.

The apparatus accordant with the invention is intended for the purification of an organic solution containing copper from impure substances, such as molybdenum, in an organic extraction solution storage tank, which is composed of a front wall, side walls, plus a back wall and a bottom. An apparatus is built into the tank, made up of at least one removal unit and its related mixing equipment for mixing aqueous solution and extraction solution into each other in a dispersion; connected to the mixing equipment, an aqueous solution suction pipe situated in the bottom section of the tank and an extraction solution suction pipe arranged in the extraction solution, as well as a dispersion distribution pipe connected to the mixing equipment, situated against the flow of extraction solution fed into the removal unit.

In one alternative embodiment of the invention, the aqueous solution suction pipe and the extraction solution suction pipe are provided with suction apertures or suction members for the even suction of solution in several separate substreams. The dispersion distribution pipe is also preferably provided with apertures or nozzles for the uniform feed of the dispersion in several separate substreams.

In another embodiment of the invention, the removal unit includes an extraction solution suction pipe located in the vicinity of the surface of the extraction solution in the rear end of the tank, provided with suction apertures or suction members and connected to a discharge conduit.

In one embodiment of the invention, the removal unit includes an aqueous solution suction pipe located in the vicinity of the bottom of the rear end of the tank, provided with suction apertures or suction members and connected to a discharge conduit.

In one embodiment of the invention, two removal units are built into the tank separated from each other by a partition wall, over which the extraction solution flows as overflow.

In another embodiment of the invention, three removal units are built into the tank, so that the removal units are separated from one another by partition walls, over which the extraction solution flows as overflow.

In one embodiment of the invention, the mixing equipment is located inside the removal unit and according to another embodiment of the invention, the mixing equipment is located outside the removal unit.

In one embodiment of the invention, the removal unit is equipped with picket fences or droplet coalescer equipment. A feed fence structure can also be arranged in the front section of the removal unit.

In one embodiment of the invention, the dispersion distribution pipe extends for a distance of at least ⅔ of the width of the tank, and is crosswise to the direction of flow of the extraction solution. The aqueous solution suction pipe and the extraction solution suction pipe also extend preferably for a distance in the lateral direction of the tank that is ½-⅔ of the width of the tank and are crosswise to the direction of flow of the extraction solution.

The invention also relates to a method for purifying hydroxy oxime-base organic extraction solution containing copper from impurity substances in the extraction solution storage tank. It is characteristic of the method that the copper-containing organic extraction solution is subjected in the storage tank to the removal of at least one impurity substance by means of aqueous solution, whereby a dispersion of aqueous and organic solutions is formed and the generated dispersion is fed against the organic solution, which is routed to at least one removal unit built inside the tank.

In one alternative embodiment of the invention, at least part of the aqueous solution and extraction solution from which the dispersion is formed, is taken from the removal unit in order to recycle the solution and achieve the required residence time.

In one alternative embodiment of the invention, the extraction solution and aqueous solution recycled from the removal unit are sucked into their suction pipes, via which the solutions are fed back into the mixing apparatus to form a dispersion.

It is typical of the method accordant with the invention that the impurity substance to be removed is molybdenum, whereby the organic extraction solution is scrubbed with an aqueous solution with a pH that has been adjusted to the range of 4.5-9.

In one embodiment of the invention, the impurity substance to be removed is at least one of the following: iron, manganese and chloride; whereby the organic extraction solution is scrubbed with an acidic aqueous solution, the pH of which is adjusted to the range of 1.5-2.5. According to another embodiment, the acidic aqueous solution may be the acidic feed solution of extraction.

In one alternative embodiment of the invention, the impurity substance to be removed is nitrate, whereby the organic solution is washed with clean water.

In one alternative embodiment of the invention, the purification of the extraction solution is carried out in two stages, whereby the acidic scrubbing of the extraction solution is performed in the first removal unit and molybdenum removal is performed in the second removal unit.

In another alternative embodiment of the invention, the purification of the extraction solution is carried out in two stages, whereby washing of the extraction solution essentially with clean water to remove the nitrate is performed in the first removal unit and molybdenum removal is performed in the second removal unit.

In a further alternative embodiment of the invention, the purification of the extraction solution is performed in three stages, whereby the acidic scrubbing of the extraction solution is performed in the first removal unit, washing of the extraction solution essentially with clean water to remove nitrate is performed in the second removal unit and the stripping of molybdenum occurs in the third removal unit.

It is typical of the invention that the organic solution to be purified is routed over a partition wall from one removal unit to another as overflow.

In one alternative embodiment of the invention, the amount of organic extraction solution with regard to the amount of aqueous solution (O/A) is between 1.5-3.5. Preferably the aqueous solution is regulated to be continuous and the extraction solution is entrained in it.

DETAILED DESCRIPTION OF THE INVENTION

By means of the method and apparatus accordant with the invention, molybdenum and if necessary also other harmful substances can be removed from an organic extraction solution containing copper (LO solution) in the liquid-liquid extraction of copper in such quantities that they do not disturb copper stripping. If it is desired to remove other impurities in addition to molybdenum, such as nitrate, it is advantageous to carry out scrubbing in at least two stages. It has been found that it is advantageous to carry out the removal of molybdenum from a solution containing copper, because the presence of copper promotes the stripping of molybdenum from organic solution into aqueous solution. In the system now developed, the slow kinetics of molybdenum and nitrate scrubbing has been particularly taken into account, and consequently both the extraction solution and the aqueous solution are recycled several times in each impurity substance removal unit in order to achieve a settling degree that is good enough.

In some cases, for instance in Chile, there may also be nitrate in the feed solutions i.e. aqueous solutions entering copper extraction. The nitrate concentration of the solution is then in the region of 2-30 mg/l. The appearance of nitrate is problematic, because nitrate promotes the decomposition of hydroxy oxime-type extraction reagents through hydrolysis and oxidation. When the nitrate concentration of an extraction solution rises to harmful levels, it is appropriate to lower the nitrate concentration. The nitrate concentration can be advantageously lowered with the same type of apparatus and procedure as is used in the removal of molybdenum from extraction solution in accordance with the invention. Nitrate is not stripped into a sulphuric acid-containing solution like copper, but is removed slowly, as the extraction solution is washed with clean water. It has also been found that a high copper concentration in the extraction solution at least partially promotes the removal of nitrate from the extraction solution.

It has now been found that the extraction solution storage tank can be equipped with at least one additional apparatus, which allows for first of all, molybdenum removal from copper-containing organic extraction solution and if necessary the removal of nitrate and other impurities. Thus at least one or several impurity removal units (described later) are built into the storage tank, in each of which the organic extraction solution is brought into contact with aqueous solution for the required residence time. When impurities are removed from the extraction solution in several different removal units, their order with regard to the direction of flow of organic extraction solution is selected so that the amount of additives used in each scrubbing step is kept as small as possible.

Figure 1:
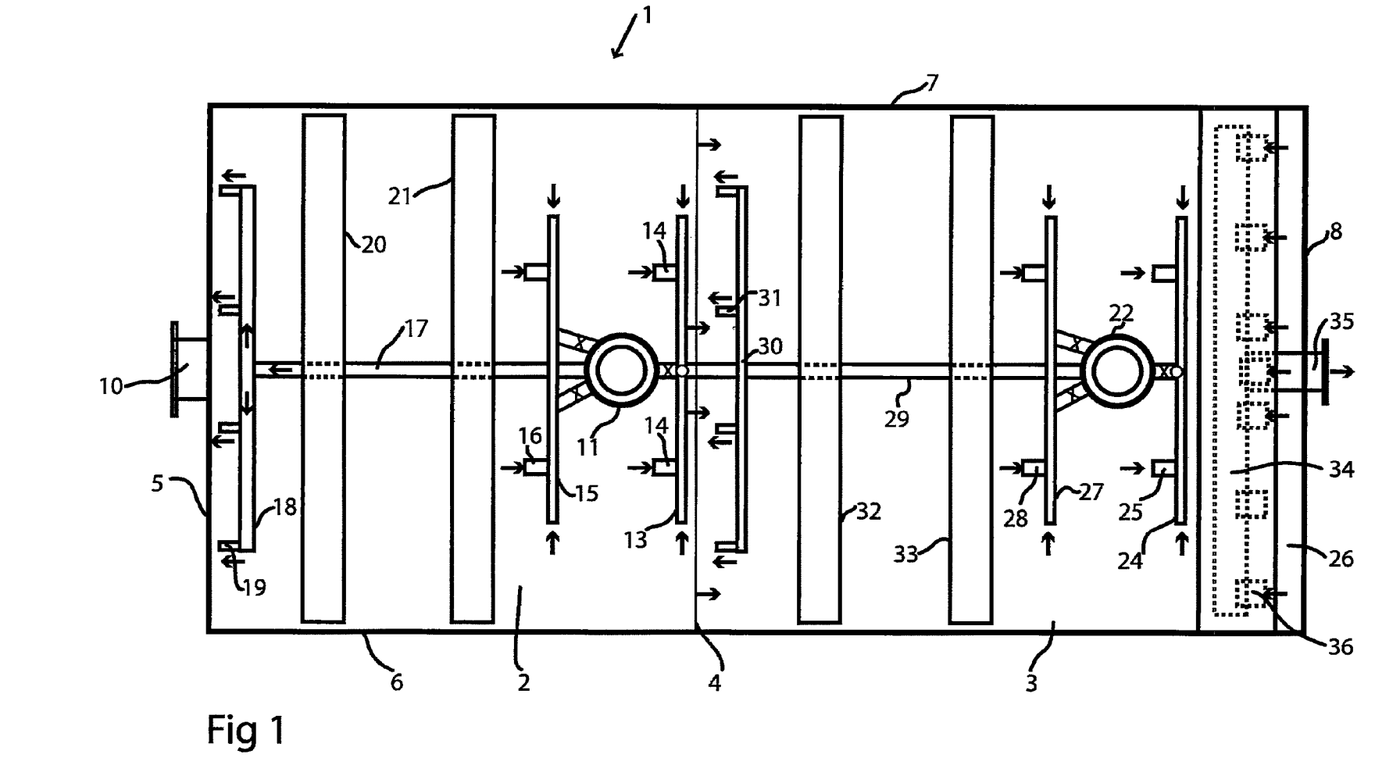
FIG. 1 presents one apparatus in accordance with the invention seen from above.
Figure 2:
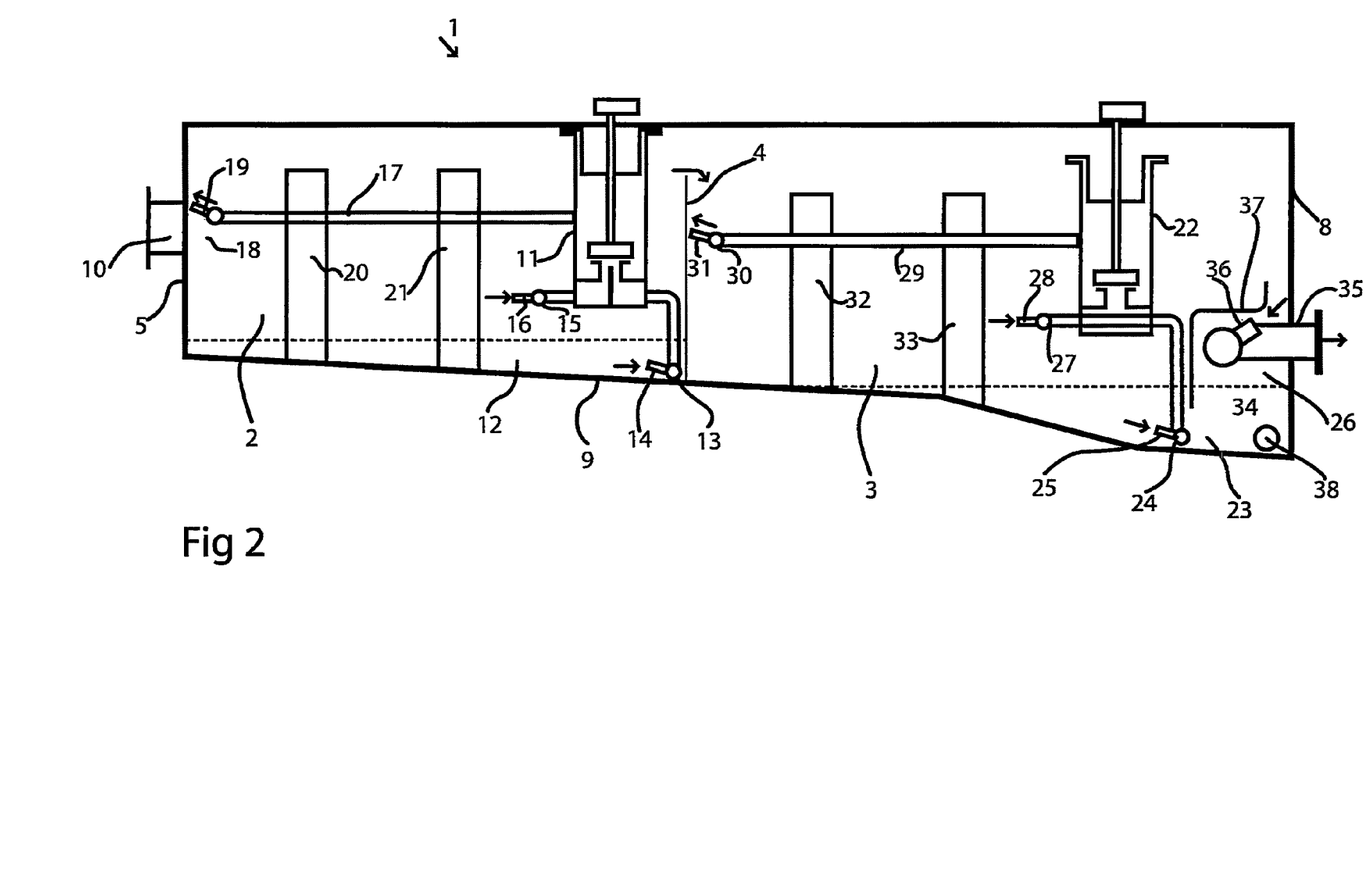
FIG. 2 is a side view of the apparatus accordant with FIG. 1.

FIGS. 1 and 2 show storage tank 1 used for molybdenum scrubbing, which in this case comprises two sections, i.e. removal units 2 and 3, with partition wall 4 between them. A tank used for removal of impurities does not require the addition of a separate extraction line; instead, the organic extraction solution storage tank, or LO tank, functions as the necessary scrubbing tank. Using the LO tank as the scrubbing tank is advantageous because the removal of molybdenum and also that of nitrate require a long delay and therefore the large extraction solution volume of the LO tank can be exploited. Since molybdenum is perhaps the most important impurity to be removed, the apparatus and method accordant with the invention are described with this in mind. Only one removal unit is required in the storage tank to be used as a scrubbing tank if the amount of other impurities, such as for example iron, manganese or nitrate, is marginal, although the use of the tank is always presented in the drawings as two-part. As stated above, one or several removal units operating on the same principle can be built into the storage tank.

A storage tank 1 consists of a front wall 5, side walls 6 and 7, a back wall 8 and bottom 9. The walls and the bottom of the tank also form the walls and bottom of the removal unit. Organic extraction solution containing copper and molybdenum is fed into the middle parts of the front section of the tank, via a feed conduit 10, preferably into the surface zone of the solution in the tank. When the first removal unit 2 of the tank is used for the removal of metallic impurities, such as iron and/or manganese, or chloride, acid-containing aqueous solution used for scrubbing the extraction solution is routed inside the first section, via a mixing equipment 11 located near the partition wall. The typical acid added to water is sulphuric acid. The acid concentration of the aqueous solution is adjusted so that only a small part of the copper contained in the organic extraction solution is extracted into the aqueous solution, so the pH is preferably in the region of 1.5-2.5. In some cases the feed solution can be used as the acidic scrubbing aqueous solution, i.e. the solution that is routed into contact with the organic solution of liquid-liquid extraction in the first extraction stage.

If the first section of the storage tank is used for the removal of nitrate, the aqueous solution to be fed is essentially pure water. It has been found empirically that nitrate is removed best when pure water is used as the washing solution. However, since there are droplets of acidic aqueous solution entrained in the extraction solution, in practice the pH of nitrate scrubbing is around 4-5. Molybdenum is removed in this scrubbing stage in only small amounts and copper is not stripped at all.

When it is wished to remove acid-soluble impurities from the extraction solution, nitrate and molybdenum, three removal units can be built into the storage tank (not shown in detail in the drawing). The most sensible sequence of units in this case is acidic scrubbing unit, nitrate removal unit and molybdenum removal unit.

One advantageous mixing device including in the apparatus is described in U.S. Pat. No. 4,628,391. The mixing device typically consists of a circulation pump, two suction lines, one pressure line and the valves required for the lines. The pump of the mixing device is preferably a pump turbine for example, which gives sufficient delivery height at a low peripheral velocity range of 3.7-4.7 m/s. A part of the aqueous solution is routed to the mixing device from outside the tank (not shown in detail in the drawing) and a part is sucked from the bottom space 12 of the removal unit by means of an aqueous solution suction pipe 13. The suction pipe is provided with several apertures or suction members 14 for the even suction of aqueous solution in several substreams. The aqueous solution suction pipe extends in the lateral direction of the tank for a distance that is ½-⅔ of the tank width and is located symmetrically in relation to the mixing device and near partition wall 4 between the first and second removal units.

Also sucked into the mixing device 11 is the organic solution to be scrubbed, by means of an extraction solution suction pipe 15 located inside the extraction solution. This pipe is also provided with suitable apertures or suction members 16 in order to suck in the extraction solution as several substreams. The extraction solution suction pipe also preferably extends for a distance that is ½-⅔ of the tank width and its location is also symmetrical in relation to the mixing device. The extraction solution suction pipe is located in the tank before the mixing device when seen in the direction of flow of the organic solution.

The aqueous solution and extraction solution fed into the lower section of the mixing device are mixed into each other and the dispersion formed in this way is used for scrubbing the extraction solution routed into the tank. The dispersion is routed from the upper section of the mixing device via pipe 17 to near the front wall 5 of the first removal unit of the tank, where the dispersion is fed via a distribution pipe 18 towards the extraction solution flowing into the tank via the feed conduit 10. The dispersion is routed to the surface zone of the extraction solution. The distribution pipe preferably extends across the entire width of the tank and at least for a distance that is ⅔ of the tank width and is crosswise to the direction of solution flow and symmetrical in relation to the feed conduit. The distribution pipe is provided with several apertures or nozzles 19 in order to feed the dispersion into the organic solution as several substreams.

The scrubbing of extraction solution with the dispersion formed from aqueous solution and organic solution can be enhanced further by placing droplet coalescer devices 20 and 21 in the tank. They are shown in the drawings only in diagrammatic form. The coalescer equipment may be of the kind described for instance in WO publication 2005/120677 or other appropriate devices. Coalescer equipment typically extends from one side wall of the tank to the other.

As described above, the aqueous solution separating from the dispersion used for scrubbing in the first removal unit of the scrubbing tank settles to the bottom of the tank and is recycled from there to the mixing device. A part of the extraction solution is also recycled to the mixing device, whereby the scrubbing time of the extraction solution is extended. Recycling enables the impurity level (Fe, Mn, chloride, nitrate) of the aqueous solution removed from the tank to be raised and therefore the removal of impurities from the aqueous solution becomes simpler.

The partially scrubbed organic extraction solution from the first removal unit 2 of the scrubbing tank is routed to flow as overflow over the partition wall 4 into the second removal unit 3 of the tank, in which the actual removal of molybdenum takes place. The extraction solution is also scrubbed with aqueous solution in the second removal unit of the scrubbing tank, but in this stage the pH of the scrubbing solution is adjusted to be much higher than in the first section. The pH of the aqueous solution is adjusted to be in the region of 4.5-9 by means of alkali fed into it. The alkali feed helps prevent the pH value of the aqueous solution from falling too much during scrubbing. It has been found that scrubbing or stripping occurs faster if the pH of the aqueous solution is regulated to be clearly on the alkaline side, but it has also been found that in this case, the aqueous solution and the extraction solution easily form an emulsion that is difficult to separate. In addition, a rise in pH also increases costs, because more of the chemical additives needed for control are required. Some suitable base chemical is used for pH control, such as alkali or earth alkali hydroxide or carbonate, for example the relevant compounds of sodium or magnesium. A typical alkali added to water is sodium carbonate. When molybdenum stripping is performed in the pH zone mentioned above, copper is not stripped into the aqueous solution.

When molybdenum stripping is performed in the selected zone, recycling of the extraction solution is advantageous in order to extend the residence time particularly in this processing stage. In practice, not all of the molybdenum needs to be removed from the extraction solution; in fact often it is sufficient to halve the content. It is also advantageous to use a large amount of organic extraction solution in the scrubbing of molybdenum in relation to the amount of aqueous solution (O/A=1.5-3.5). Preferably the aqueous solution is regulated to be continuous and the extraction solution entrained in it, so that a dense droplet aggregation of organic solution is obtained inside the aqueous solution, i.e. plenty of surface area is formed between the phases. In some cases, the extraction solution may also be continuous.

As stated above, if it is desired to remove from the extraction solution both impurities that are removed by acidic scrubbing and nitrate in addition to molybdenum, molybdenum removal takes place in a third removal unit, into which the organic extraction solution flows as overflow from the second removal unit. When it is wished to remove only molybdenum from the extraction solution, the treatment of the extraction solution can be performed in a single stage, which in practice corresponds to the first removal unit of the apparatus shown in the drawings.

The second removal unit of the scrubbing tank is equipped with the same type of structures as the first section, i.e. in the rear end of the second removal unit there is a mixing apparatus 22, into which aqueous solution is fed to which alkali has been added from outside the tank (not shown in detail in the drawing). In addition to the aqueous solution entering from outside, some of the aqueous solution is sucked into the mixing device from the bottom space 23 of the first tank section by means of an aqueous solution suction pipe 24. The suction pipe is provided with several apertures or suction members 25 in order to suck in the aqueous solution evenly in several substreams. The aqueous solution suction pipe extends in the lateral direction of the tank for a distance that is ½-⅔ of the tank width and is located symmetrically in relation to the mixing device and near the rear end of the second removal unit, however before the extraction solution discharge zone 26.

Also sucked into the mixing device 22 is the organic solution to be scrubbed, by means of an extraction solution suction pipe 27 located inside the extraction solution. This pipe is also provided with suitable apertures or suction members 28 in order to suck in the extraction solution as several substreams. The extraction solution suction pipe also preferably extends for a distance that is ½-⅔ of the tank width and its location is likewise symmetrical in relation to the mixing device. The extraction solution suction pipe is located in the tank before the mixing device when seen in the direction of flow of the organic solution. Recycling not only extends the residence time but also enables the molybdenum concentration of the aqueous solution removed from the tank to be raised and therefore the removal of molybdenum from the aqueous solution at a later stage becomes simpler.

In the mixing device 22, the aqueous solution and extraction solution fed into it are mixed into each other and the dispersion formed in this way is used for scrubbing the extraction solution by spraying it against the extraction solution flowing into the second removal unit. The dispersion is routed via a connection pipe 29 to near the partition wall 4, where it is fed via a dispersion distribution pipe 30 towards the extraction solution flowing from the first removal unit into the second as overflow. The dispersion is fed into the surface zone of the extraction solution. The distribution pipe preferably extends across the entire width of the tank and at least for a distance that is ⅔ of the tank width and is crosswise to the direction of solution flow. The distribution pipe is provided with several apertures or nozzles 31 in order to feed the dispersion into the organic solution.

The scrubbing of extraction solution with the dispersion formed from aqueous solution and organic solution can be enhanced further also in the section meant for molybdenum removal by placing in the tank picket fences or droplet coalescer devices 32 and 33, which are shown in the drawings only in diagrammatic form. The coalescer equipment may be of the kind described for instance in WO publication 2005/120677 or other appropriate equipment. The coalescer equipment typically extends from one side wall of the tank to the other. When the above-mentioned devices are used as the coalescer equipment, a flow plate cassette, in which the distance between the flow plates is around 4-15 mm, is placed in their upper section.

It is advantageous to recycle the aqueous solution used for extraction solution scrubbing, in particular that intended for the removal of molybdenum, for a sufficiently long time, for instance 5-20 times, so that the molybdenum slowly being removed from the organic solution is concentrated in it in the desired quantities. Likewise, the removal of nitrate also requires a long residence time.

When the organic extraction solution has been treated in the scrubbing tank in at least the molybdenum removal unit, the extraction solution is removed from the extraction solution removal zone 26 in the rear end of the tank. The extraction solution is collected into a suction pipe 34 that preferably extends across the entire width of the tank and is set perpendicularly to the direction of flow and is routed from there on to a discharge conduit 35 for further processing. Obviously, the discharge conduit can be located either on the back wall of the tank or in the rear section of the side wall. The extraction solution is collected into the suction pipe via apertures in the pipe or other suitable suction members 36 as several substreams. The suction pipe is preferably equipped with a protective structure 37, which helps ensure that only pure extraction solution free of water droplets is removed from the tank. A part of the aqueous solution is also removed from the bottom section of the tank via an aqueous solution discharge conduit 38. An advantageous solution removal method is described for example in WO publication 2005/120677, but the invention accordant with the application is not confined to this answer.

Figure 3:
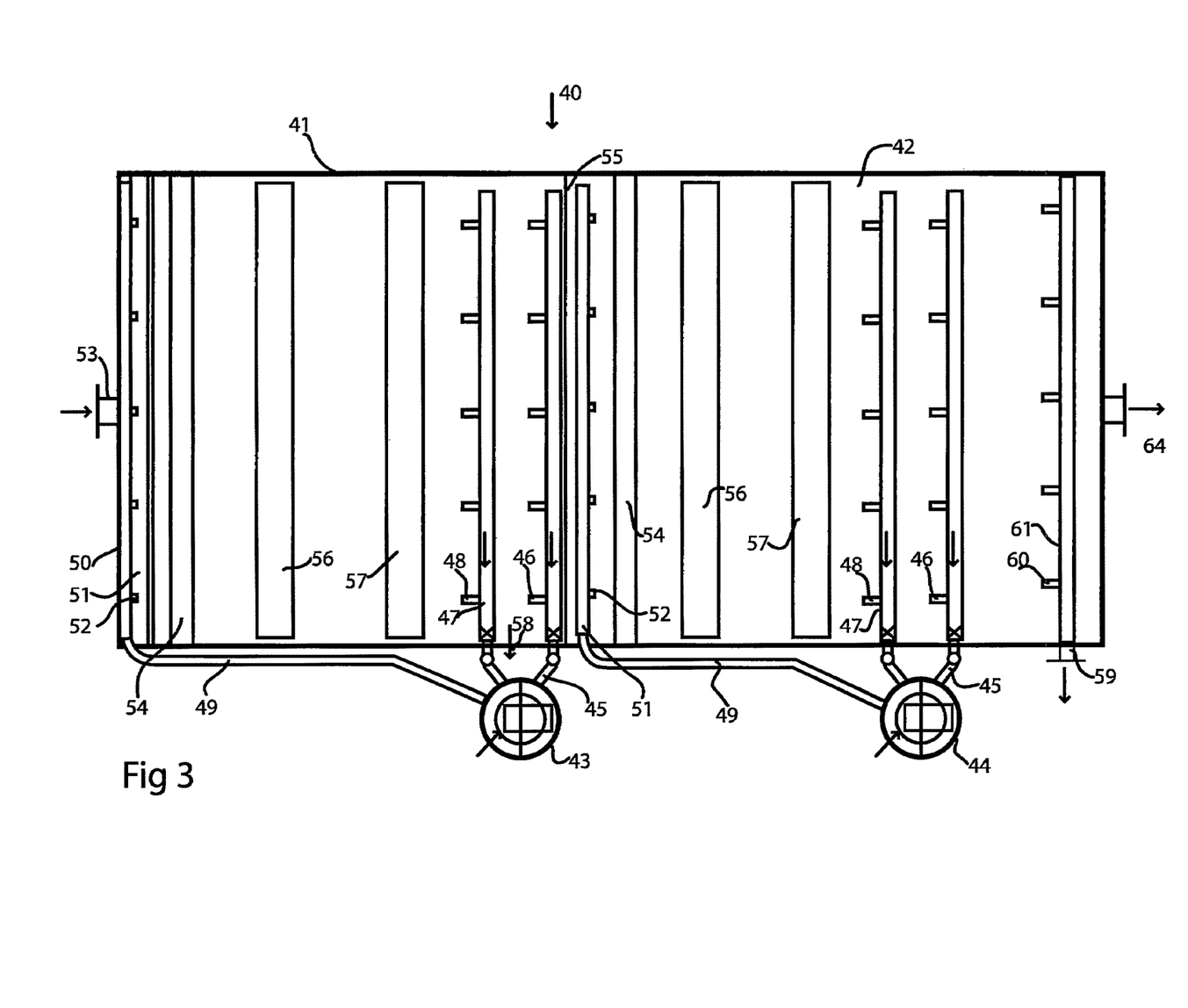
FIG. 3 is another apparatus in accordance with the invention seen from above.
Figure 4:
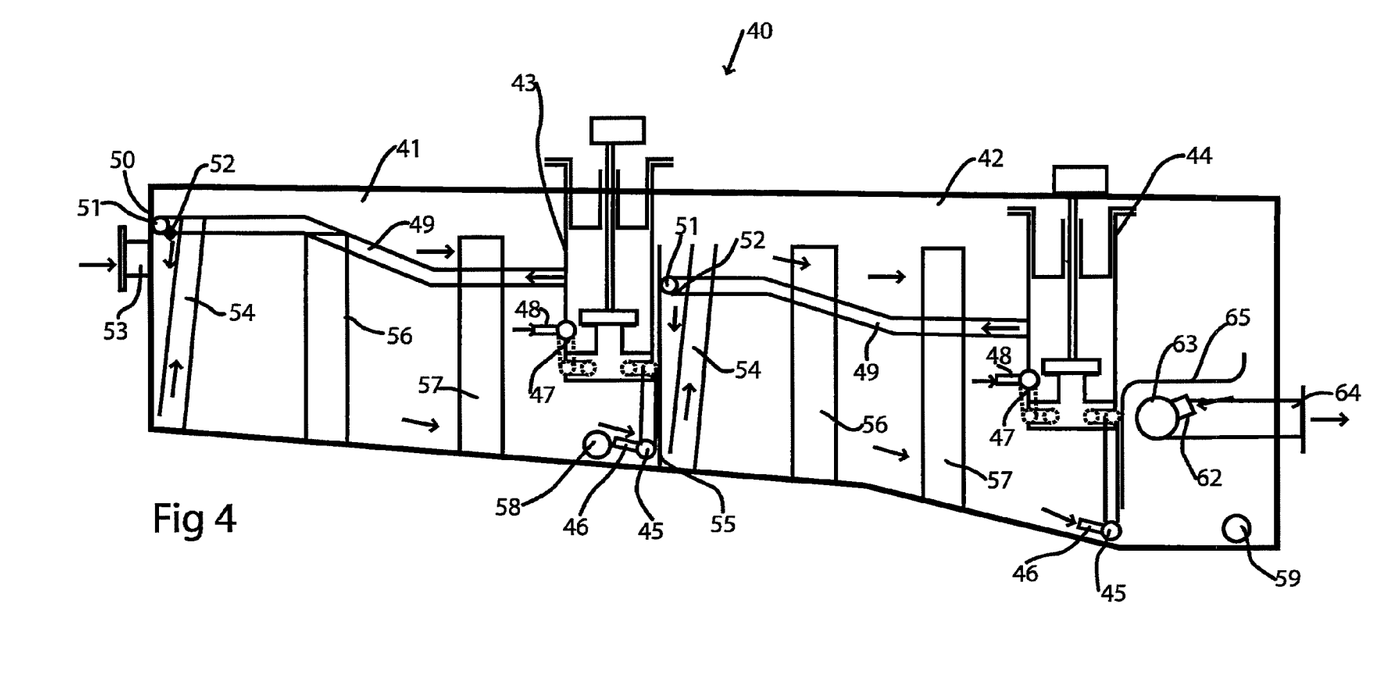
FIG. 4 is a side view of the apparatus accordant with FIG. 3.

FIGS. 3 and 4 depict another storage tank 40 construction accordant with the invention, which is in principle the same kind as that described above, but its framework allows the equipment solutions to be changed more. As shown in FIG. 3, mixing equipment 43 and 44 of both the first removal unit 41 and the second removal unit 42 are located outside the tank. This enables the size of the mixing device to be changed flexibly as necessary and even the addition of separate mixers to the apparatus in addition to the mixing equipment. Each tank section is equipped with both an aqueous solution suction pipe 45 with suction members 46 and an organic solution suction pipe 47 with suction members 48. The solutions exiting the suction pipes are routed to their own section of the mixing device. The aqueous solution suction pipe and the extraction solution suction pipe extend laterally across the tank for a distance that is ½-⅔ of the tank width and are crosswise to the direction of flow of the solution.

The dispersion formed in the mixing device of the first section is fed via a connection pipe 49 into front section 50 of the tank, where it is routed via a distribution pipe 51 to be fed through several separate feed apertures or feed members 52 towards the surface section of the extraction solution in several separate substreams. The distribution pipe extends preferably across the entire width of the tank and at least for a distance that is ⅔ of the tank width and is crosswise to the direction of flow of the solution. The extraction solution is fed into the front section of the tank via a feed conduit 53. The difference from the apparatus shown in FIGS. 1 and 2 is that the organic extraction solution and the dispersion in the tank, or in a section of it, such as the front section of the molybdenum removal unit, are made to mix together more effectively than before by routing them through a feed fence 54 made up of at least two plates, between which the direction of flow of the extraction solution and the dispersion is changed for a while, for example to a basically vertical instead of horizontal direction. One such feed fence structure is described in U.S. Pat. No. 7,465,402. The structure accordant with the invention is not however confined to this solution.

The second removal unit 42 of the scrubbing tank is also equipped with a feed fence structure 54, to which are routed the organic extraction solution flowing over a partition wall 55 as overflow from the first section and the dispersion formed in the mixing device 44. The dispersion formed in the mixing device is routed in the same way as in the first section via a connection pipe 49, distribution pipe 51 and distribution members 52 to the vicinity of the partition wall, ahead of feed fence structure 54 when seen in the direction of flow.

If it is wished to implement the storage tank 40 as a single-section removal unit, the organic extraction solution is fed into the tank via a feed conduit and is treated for molybdenum removal as described above. Likewise the storage tank 40 may be made up of three removal units, as described above.

As mentioned in connection with FIGS. 1 and 2, the scrubbing of extraction solution with aqueous solution and a dispersion formed of the aqueous solution and extraction solution can be further enhanced by placing picket fences or droplet coalescer devices 56 and 57 in the storage tank. The coalescers are presented in the drawings in diagrammatic form only. The coalescer equipment may be of the kind described for instance in WO publication 2005/120677 or other appropriate devices. Coalescer equipment typically extends from one sidewall of the tank to the other.

FIGS. 3 and 4 also show aqueous solution discharge conduits 58 and 59 from both the first and second removal units. The aqueous solution is sucked from the bottom section of the tank via several suction members 60 into an aqueous solution suction pipe 61 and then further to the discharge conduit of each section. As regards the extraction solution, it is discharged from the rear of the second removal unit, near the surface via extraction solution suction members 62, a suction pipe 63 to an extraction solution discharge conduit 64 as described above. Again it is advantageous to provide the extraction solution discharge structure with a protective structure 65.

The method and apparatus for stripping molybdenum and other impurities described above can be used either periodically or continuously. If the process is implemented periodically, the required equipment size and quantity of extraction solution in relation to the amount of molybdenum to be removed is greater than if the process is performed as a continuous process. However, when running periodically the chemical driving force of the reaction that takes place is greater than in a continuous process.

EXAMPLES

Example 1

A test for removing molybdenum was carried out in a batch reactor, where the temperature had been regulated to 25° C. The extraction reagent of the organic extraction solution was LIX 860 (5-dodecyl salicylaldoxime) and its concentration in the extraction solution was 13.8 wt %, with iso-octane as solvent. The Mo concentration of the extraction solution was 0.22 g/l and the Cu concentration 3.44 g/l. A lye solution was used as aqueous solution, where the pH was initially 10.8. The solutions were mixed together into a dispersion with a mixer having a rotational speed of 1500 rpm.

As the test proceeded, the pH value and Mo concentration of the aqueous solution were measured. The appended Table 1 shows that after 50 min about 70% of the molybdenum transferred to the aqueous phase, the pH of which had fallen to a value of 5.6. The amount of molybdenum remaining in the organic solution is no longer harmful.

TABLE 1

| Contact time min | pH of aqueous solution | Mo concentration of aqueous solution mg/l |
|---|---|---|
| 0.17 | 10.7 | 26.9 |
| 0.50 | 10.5 | 42.0 |
| 0.75 | 10.3 | 45.2 |
| 1.00 | 10.2 | 48.9 |
| 1.50 | 10.0 | 66.1 |
| 3.00 | 9.5 | 79.1 |
| 5.00 | 8.9 | 87.0 |
| 10.00 | 8.2 | 92.1 |
| 15.00 | 7.8 | 99.0 |
| 20.00 | 7.5 | 110.2 |
| 30.00 | 6.5 | 133.9 |
| 45.00 | 5.6 | 149.9 |
| 80.00 | 5.4 | 154.2 |

Example 2

A test for the removal of nitrate was performed in a batch reactor, where the temperature was regulated to be 25° C. The extractant of the organic extraction solution was Acorga M5640 (a hydroxy oxime derivative) and its concentration in the solution was 22.5 vol %, with Escaid 100 (kerosene) as diluting agent. In the first step the extraction solution was contacted with aqueous solution that contained nitrate. The aqueous solution contained 7.0 g/l Cu, 0-15 g/l $Fe^{3+}$, 20 g/l $NO_3^-$, 60 g/l $SO_4^{2-}$ ($Na_2SO_4$) and the pH of the sulphuric acid-containing solution was initially 1.5. The aqueous solution was mixed with the extraction solution at a ratio of O/A 1:1 with a mixer that had a rotational speed of 1000 rpm for a period of 12 hours. After this almost all the copper and iron had been extracted into the organic extraction solution and the amount of nitrate in the extraction solution was 3.3 mg/l.

The organic extraction solution was subjected to washing with pure water for a period of 12 hours, after which the nitrate concentration of the extraction solution was 2.0 mg/l. As scrubbing proceeded, it was observed that the iron in the extraction solution slowed down the nitrate scrubbing. Therefore it may be stated that if there is a significant amount of iron in the extraction solution, it is worth removing it substantially before the removal of nitrate.

The invention claimed is:

1. An apparatus for purifying an organic extraction solution containing copper from impurity substances, in an organic extraction solution storage tank which comprises a front wall, side walls, a back wall and bottom, and an inlet which provides a flow of the organic extraction solution wherein the apparatus is built into the organic extraction solution storage tank and comprises two removal units and a mixing device attached to each removal unit for mixing together the aqueous solution and extraction solution into a dispersion; an aqueous solution suction pipe connected to each mixing device and located in a bottom section of each removal unit and an extraction solution suction pipe arranged in the extraction solution, and a dispersion distribution pipe connected to each mixing device, and located to distribute the dispersion against the flow of extraction solution fed into each removal unit, wherein the two removal units are separated from each other by a partition wall, over which the extraction solution flows as overflow.

2. An apparatus according to claim 1, wherein the aqueous solution suction pipe pipes and the extraction solution suction pipe pipes are provided with suction apertures or suction members for the even suction of solution in several separate substreams.

3. An apparatus according to claim 1, wherein the dispersion distribution pipe is pipes are provided with apertures or nozzles for the even feed of the dispersion in several separate substreams.

4. An apparatus according to claim 1, wherein the second removal unit includes an extraction solution suction pipe located in the vicinity of the surface of the extraction solution in the rear end of the tank, and that said extraction solution suction pipe is provided with suction apertures or members and wherein the second removal unit is connected to a discharge conduit.

5. An apparatus according to claim 1, wherein the second removal unit includes an aqueous solution suction pipe located in the vicinity of the bottom in the rear end of the tank, and that it is provided with suction apertures or members and wherein the second removal unit is connected to a discharge conduit.

6. An apparatus according to claim 1, wherein three removal units are built into the tank, so that the removal units are separated from each other by partition walls, over which the extraction solution flows as overflow.

7. An apparatus according to claim 1, wherein the mixing devices are located inside the removal units.

8. An apparatus according to claim 1, wherein the mixing devices are located outside the removal units.

9. An apparatus according to claim 1, wherein the removal units are equipped with picket fences or droplet coalescer devices.

10. An apparatus according to claim 1, wherein a feed fence structure is arranged in a front section of each removal unit.

11. An apparatus according to claim 1, wherein the dispersion distribution pipe attached to each mixing device to distribute the dispersion of the aqueous solution and the organic extraction solution extends at least for a distance that is ⅔ of the width of the tank and is crosswise to the direction of flow of the extraction solution.

12. An apparatus according to claim 1, wherein the aqueous solution suction pipe pipes and the extraction solution suction pipe pipes extend in the lateral direction of the tank for a distance that is ½-⅔ of the width of the tank and are crosswise to the direction of flow of the extraction solution.

13. A method for purifying organic hydroxy oxime-based extraction solution containing copper from impurity substances in an extraction solution storage tank comprising forming a flow of the extraction solution from an inlet to a discharge, removing at least one impurity substance from the copper-containing organic extraction solution in two removal units built inside the extraction solution storage tank by means of an aqueous solution, forming a dispersion of the aqueous solution and the extraction solution and feeding the generated dispersion against the flow of the organic extraction solution, wherein the two removal units are separated from each other by a partition wall, over which the extraction solution flows as overflow and wherein at least a part of the aqueous solution and extraction solution, from which the dispersion is formed, is taken from each removal unit in order to recycle the solution and achieve a required residence time.

14. A method according to claim 13, wherein the extraction solution and aqueous solution to be recycled from each removal unit are sucked up into suction pipes, through which the solutions are fed back to the mixing device to form the dispersion.

15. A method according to claim 13, wherein the impurity substance to be removed is molybdenum, whereby the organic extraction solution is scrubbed using an aqueous solution having a pH that has been regulated to the region of 4.5-9.

16. A method according to claim 13, wherein the impurity substance to be removed is at least one of the following: iron, manganese, and chloride, whereby the organic extraction solution is scrubbed with an acidic aqueous solution, having a pH that has been regulated to the region of 1.5-2.5.

17. A method according to claim 13, wherein the impurity substance to be removed is at least one of the following: iron, manganese, and chloride, whereby the organic extraction solution is scrubbed with the acidic feed solution of extraction.

18. A method according to claim 13, wherein the impurity substance to be removed is nitrate, whereby the organic extraction solution is washed with pure water.

19. A method according to claim 13, wherein the purification of the extraction solution is performed in two stages, whereby acidic scrubbing of the extraction solution is carried out in the first removal unit and molybdenum removal is carried out in the second removal unit.

20. A method according to claim 13, wherein the purification of the extraction solution is performed in two stages, whereby scrubbing of the extraction solution is carried out in the first removal unit essentially with pure water to remove nitrate and the removal of molybdenum is performed in the second removal unit.

21. A method according to claim 13, wherein the purification of the extraction solution is performed in three stages, whereby acidic scrubbing of the extraction solution is carried out in the first removal unit, scrubbing of the extraction solution essentially with pure water to remove nitrate is done in the second removal unit and molybdenum stripping is carried out in a third removal unit.

22. A method according to claim 13, wherein the amount of the organic extraction solution in relation to the amount of the aqueous solution is between 1.5-3.5.

23. A method according to claim 22, wherein the aqueous solution is regulated to be continuous and the extraction solution is entrained in it.

* * * * *